United States Patent [19]

Raiford et al.

[11] Patent Number: 5,344,903
[45] Date of Patent: Sep. 6, 1994

[54] WATER- AND OIL-REPELLENT FLUORO(METH)ACRYLATE COPOLYMERS

[75] Inventors: Kimberly G. Raiford; Edward J. Greenwood; Robert H. Dettre, all of Hockessin, Del.

[73] Assignee: E. I. Du Pont de Nemours and Company, Wilmington, Del.

[21] Appl. No.: 48,350

[22] Filed: Apr. 14, 1993

[51] Int. Cl.$^5$ .............................................. C08F 20/24
[52] U.S. Cl. .................................................. 526/245
[58] Field of Search ........................................ 526/245

[56] References Cited

U.S. PATENT DOCUMENTS 4,100,340  7/1978  Waldmann et al. ................. 526/245

FOREIGN PATENT DOCUMENTS 0234724   9/1987   European Pat. Off. ............ 526/245
50-3438   4/1975   Japan ................................. 526/245
61-291677 12/1986  Japan ................................. 526/245
3256310   11/1991  Japan ................................. 526/245

Primary Examiner—Jeseph L. Schofer
Assistant Examiner—N. Sarofim
Attorney, Agent, or Firm—Charles E. Feeny

[57] ABSTRACT

Lower homologue perfluoroalkylethyl (meth)acrylates copolymerized with vinylidene chloride and alkyl (meth)acrylates; optionally with N-methylolacrylamide, hydroxyalkyl (meth)acrylates, and/or alkyloxy (meth)acrylates, impart high levels of water-, alcohol- and oil-repellency to fabrics under mild conditions.

4 Claims, No Drawings

WATER- AND OIL-REPELLENT FLUORO(METH)ACRYLATE COPOLYMERS

FIELD OF THE INVENTION

The invention described herein relates to novel copolymers comprising polymer units derived from perfluoroalkylethyl (meth)acrylates, vinylidene chloride, and alkyl(meth)acrylates which, in the form of aqueous compositions, will impart oil-, alcohol- and water-repellency to fabrics without the need to utilize heat-curing of the treated substrate as practiced in the prior art. (In all instances herein, the term "(meth)acrylate" is used to denote either acrylate or methacrylate, and the term "N-methylol(meth)acrylamide" is used to denote either N-methylolacrylamide or N-methylolmethacrylamide.

BACKGROUND OF THE INVENTION

Perfluoroalkylethyl (meth)acrylate-containing copolymers having utility as textile-treating agents for the purpose of imparting oil- and water-repellency are known. Solvent-based formulations which do not require a heatcuring step during application have been described by Kirimoto and Hayashi in U.S. Pat. No. 3,920,614; however, environmental and safety concerns now require virtually all such applications to be made from aqueous formulations in place of organic solvents. Greenwood, Lore, and Rao, in U.S. Pat. No. 4,742,140, disclose perfluoroalkylethyl acrylate/vinylidene chloride/alkyl (meth)acrylate copolymers which, after application to polyamide textile substrates from an aqueous formulation, imparted oil- and water-repellency to the substrates. The Greenwood et al. perfluoroalkylethyl acrylate monomers have the formula:

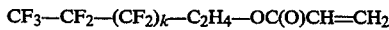

$$CF_3-CF_2-(CF_2)_k-C_2H_4-OC(O)CH=CH_2$$

in which the monomer molecular weight distribution is given as:
- 0–10 weight % of the fluoromonomer with k=or >4
- 45–75 weight % of the fluoromonomer with k=6
- 20–40 weight % of the fluoromonomer with k=8
- 1–20 weight % of the fluoromonomer with k=10
- 0–5 weight % of the fluoromonomer with k=or >12

All of the prior compositions which can be applied from an aqueous emulsion require a heat-curing step after application and drying. For example, Greenwood et al. heat-treated the fabric at 140° C. to 190° C. for at least 30 sec, typically 60 to 180 sec.

SUMMARY OF THE INVENTION

The present invention relates to novel aqueous emulsion polymers based on lower homologue distributions of perfluoroalkylethyl (meth)acrylates copolymerized with vinylidene chloride and nonfluorinated alkyl (meth)acrylates; optionally with N-methylol(meth)acrylamide, hydroxyalkyl (meth)acrylates, and/or alkyloxy (meth)acrylates. It relates also to the use of the copolymers as oil-, water- and alcohol-repellents. The copolymers impart high levels of water-, alcohol- and oil-repellency to fabrics under milder drying and curing conditions than those required to achieve commercially useful repellent properties with conventional aqueous fabric treatment compositions. The aqueous dispersions can be used to treat a variety of woven and nonwoven textile fabrics made from natural or synthetic fibers including cotton, cellulose, wool, silk, polyamide, polyester, polyolefin, polyacrylonitrile, rayon, acetate as well as paper and leather substrates.

DETAILED DESCRIPTION OF THE INVENTION

The perfluoroalkylethyl (meth)acrylates useful for preparing the novel copolymers of this invention are in the form of mixtures of monomers having the formula:

$$CF_3\ CF_2(CF_2)_kCH_2CH_2OC(O)C(R)=CH_2$$

wherein R=H or CH3, and k is 4,6,8,10 and 12 consisting essentially of:
- 25–70 weight % of monomers wherein k=4 or less
- 20–40 weight % of monomers wherein k=6
- 5–25 weight % of monomers wherein k=8
- 0–15 weight % of monomers wherein k=10 or greater.

In a particular embodiment (hereinafter "low distribution"), the distribution is essentially as follows:
- 45–70 weight % of monomers wherein k=4 or less
- 20–35 weight % of monomers wherein k=6
- 5–10 weight % of monomers wherein k=8
- 0–5 weight % of monomers wherein k=10 or greater;

In another particular embodiment (hereinafter "middle distribution"), the distribution consists essentially of:
- 25–45 weight % of monomers wherein k=4 or less
- 25–40 weight % of monomers wherein k=6
- 10–25 weight % of monomers wherein k=8
- 1–15 weight % of monomers wherein k=10 or greater.

Because of their industrial availability, fluoropolymers of this invention which are based on the "middle distribution" are considered to be the best mode of carrying out the invention, particularly the fluoropolymer of EXAMPLE 6.

The nonfluorinated (meth)acrylates comprise alkyl (meth)acrylates in which the alkyl group is a straight or branched chain radical containing 2 to 20 carbon atoms, preferably 8 to 18 carbon atoms. The $C_2$–$C_{20}$ alkyl (meth)acrylates (linear or branched) are exemplified by, but not limited to, alkyl(meth)acrylates where the alkyl group is ethyl, propyl, butyl, isoamyl, hexyl, cyclohexyl, octyl, 2-ethylhexyl, decyl, isodecyl, lauryl, cetyl, or stearyl. The preferred examples are 2-ethylhexyl acrylate, lauryl acrylate and stearyl acrylate. Optional N-methylol monomers are exemplified by, but not limited to N-methylolacrylamide and N-methylolmethacrylamide. The optional hydroxyalkyl (meth)acrylates have alkyl chain lengths in range between 2 and 4 carbon atoms, and are exemplified by 2-hydroxyethyl acrylate, 2-hydroxyethyl methacrylate. The optional alkyloxy(meth)acrylates also have alkyl chain lengths in range between 2 and 4 carbon atoms, and contain between 1 and 12 oxyalkylene units per molecule, preferably between 4 and 10 oxyalkylene units per molecule, and most preferably between 6 and 8 oxyalkylene units per molecule, as determined by gas chromatography/mass spectrometry. Specific examples of the poly(oxyalkylene)(meth)acrylates are exemplified by, but not limited to, the reaction product of 2-hydroxyethyl methacrylate and nine mols of ethylene oxide (also known as 2-hydroxyethyl methacrylate/9-ethylene oxide adduct) and the reaction product of 2-hydroxyethyl methacrylate and six mols of ethylene oxide (also known as 2hydroxyethyl methacrylate/6-ethylene oxide adduct). In an embodiment, the copolymers are made from 50–80 wt. % perfluoroalkylethyl (meth)acrylates, 10–40 wt. % $C_2$–$C_{20}$ alkyl (meth)acrylates, 10–40 wt. % vinylidene chloride, 0–2 wt. % N-methylol-acrylamide, 0–2 wt. % 2-hydroxyethyl methacrylate and 0–5 wt. % poly(oxyethylene)methacrylate.

The fluorinated copolymers of this invention are prepared in water by free radical initiated emulsion polymerization of a mixture of perfluoroalkylethyl (meth)acrylate homologues with vinylidene chloride, alkyl (meth)acrylates, and, optionally, N-methylol(-meth)acrylamide and hydroxyalkyl- or alkyloxy(meth-)acrylates. The fluoropolymers of this invention are made by agitating the monomers described above in water with a surfactant in a suitable reaction vessel which is equipped with an agitation device and an external heating and cooling device. A free radical initiator is added and the temperature raised to 40°–70° C. A polymerization regulator or chain transfer agent may be added to control molecular weight of the resultant polymer. The product of the reaction is an aqueous dispersion which is diluted further with water. The polymerization initiator is exemplified by, but not limited to, 2,2'-azobis(2-amidinopropane dihydrochloride or 2,2'-azobis(isobutyramidine) dihydrochloride. The polymerization regulator or chain transfer agent is exemplified by, but not limited to, dodecylmercaptan.

The fluoropolymers of this invention will impart oil- and water-repellency to fibrous substrates, such as textile fabrics, without heating the treated substrate above room temperature (about 20° C.). Thus, the fluoropolymers can be applied to the subtrate in the form of an aqueous emulsion by conventional techniques, such as padding or spraying, after which excess liquid is squeezed off or removed by vacuum. After removal of excess liquid, development of the water- and oil-repellency characteristics of the substrate can be achieved simply by air-drying the treated substrates. The period of time required to effect air-drying will be apparent to one skilled in the art by observation. As would be expected, the time needed to complete air-drying of the treated substrate will vary, depending on a number of factors, such as the composition and weight of the substrate, the quantity of liquid retained by the substrate at the time air-drying is commenced, and the like. While heating is not necessary for development of the repellent properties of the polymers of this invention, the treated fabric may be warmed for a matter of seconds so as to speed up the completion of air-drying. In one embodiment, the treated fabric was air-dried for about 16 to 24 hours at about 20° C.; in another, about 72 hours at about the same temperature. In yet another embodiment, the treated fabric was air-dried for about 16 to 24 hours at about 20° C., and thereafter heated at about 38° C. for about 10 seconds.

In the Examples that follow, further illustrating the invention, the terms "perfluoroalkylethyl acrylate mixture A" and "perfluoroalkylethyl acrylate mixture B" refer respectively to mixtures of perfluoroalkylethyl acrylates having the "low distribution" and the "middle distribution" described above.

EXAMPLE 1

A water emulsion was prepared by mixing the following:

64.0 g of perfluoroalkylethyl acrylate mixture A
18.0 g stearyl methacrylate
8.0 g stearic acid/14-ethylene oxide adduct
2.0 g 2-hydroxyethyl methacrylate/9-ethylene oxide adduct
1.0 g N-methylolacrylamide
1.0 g 2-hydroxyethyl methacrylate
0.5 g dodecylmercaptan
140.0 g deionized water.

The emulsion was added to a glass reaction vessel equipped with an agitator, a thermometer and a dry-ice condenser. The mixture was purged with nitrogen gas for one hour, and then the nitrogen purge was switched to a positive pressure nitrogen blanket. To the aqueous monomer emulsion were added 18.0 g of vinylidene chloride, 50.0 g acetone and 1.0 g 2,2'-azobis(2-amidinopropane dihydrochloride dissolved in 10 g deionized water to initiate the polymerization. The resultant mixture was heated to 50° C. and held at 50° C. for 8 hours. The polymerization yielded a polymer latex weighing 321 g with a solids content of 34.8%.

EXAMPLE 2

A water emulsion was prepared by mixing the following:

30.0 g of perfluoroalkylethyl acrylate mixture A
10.0 g of stearyl acrylate
4.0 g of stearic acid/14-ethylene oxide adduct
1.0 g of 2-hydroxyethyl methacrylate/9-ethylene oxide adduct
0.15 g of ethoxylated carboxylated octadecylamine
0.5 g of N-methylolacrylamide
0.5 g of 2-hydroxyethyl methacrylate
0.25 g of dodecylmercaptan
10.0 g hexylene glycol
100.0 g deionized water.

The emulsion was added to a glass reaction vessel equipped with an agitator, a thermometer and a dry ice condenser. The mixture was purged with nitrogen gas for one hour, and then the nitrogen purge was switched to a positive pressure nitrogen blanket. To the aqueous monomer emulsion were added 10.0 g of vinylidene chloride and 0.5 g 2,2'-azobis(2-amidinopropane dihydrochloride dissolved in 5.0 g deionized water to initiate the polymerization. The resultant mixture was heated to 50° C. and held at 50° C. for 8 hours. The polymerization yielded a polymer latex weighing 175 g with a solids content of 31.1%.

EXAMPLES 3–10 & CONTROLS A & B

Emulsion polymers were prepared substantially according to the procedure of Example 2 to provide the compositions given in Table 1.

TABLE 1

| Monomer | Quantity of Monomers in Emulsion for Example/Control (parts by weight) | | | | | | | | | |
|---|---|---|---|---|---|---|---|---|---|---|
| | 3 | 4 | 5 | 6 | 7 | 8 | 9 | 10 | A | B |
| Perfluoroalkylethyl acrylate B | 60 | 0 | 0 | 0 | 0 | 0 | 0 | 0 | 0 | 0 |
| Perfluroalkylethyl methacrylate A | 0 | 60 | 0 | 0 | 0 | 0 | 0 | 0 | 0 | 0 |
| Perfluoroalkylethyl | 0 | 0 | 60 | 60 | 80 | 50 | 60 | 60 | 60 | 60 |

TABLE 1-continued

| Monomer | Quantity of Monomers in Emulsion for Example/Control (parts by weight) | | | | | | | | | |
|---|---|---|---|---|---|---|---|---|---|---|
| | 3 | 4 | 5 | 6 | 7 | 8 | 9 | 10 | A | B |
| methacrylate B | | | | | | | | | | |
| 2-Ethylhexyl methacrylate | 20 | 0 | 20 | 0 | 0 | 0 | 0 | 0 | 0 | 0 |
| 2-Ethylhexyl Acrylate | 0 | 0 | 0 | 20 | 10 | 10 | 0 | 0 | 0 | 0 |
| Stearyl methacrylate | 0 | 20 | 0 | 0 | 0 | 0 | 0 | 0 | 0 | 0 |
| Stearyl acrylate | 0 | 0 | 0 | 0 | 0 | 0 | 0 | 20 | 40 | 0 |
| Lauryl acrylate | 0 | 0 | 0 | 0 | 0 | 0 | 20 | 0 | 0 | 0 |
| Vinylidene chloride | 20 | 20 | 20 | 20 | 10 | 40 | 20 | 20 | 0 | 20 |
| N-methylolacrylamide | 1 | 1 | 1 | 1 | 1 | 1 | 1 | 1 | 1 | 1 |
| 2-Hydroxyethyl methacrylate | 1 | 1 | 1 | 1 | 1 | 1 | 1 | 1 | 1 | 1 |
| 2-Hydroxyethyl methacrylate/ 10-Ethylene oxide adduct | 2 | 2 | 2 | 0 | 0 | 0 | 2 | 2 | 2 | 0 |
| 2-Hydroxyethyl methacrylate/ 7-Ethylene oxide adduct | 0 | 0 | 0 | 2 | 2 | 2 | 0 | 0 | 0 | 2 |

TEST METHODS the following test methods were used to evaluate substrates treated with the fluoropolymers of EXAMPLES 1-10, CONTROLS A, B and other CONTROLS:

REPELLENCY TESTING

1. Fabric Treatment

A portion of the polymer dispersion was diluted with water to a polymer content of 0.5-2%, such that, after application to selected fabrics by padding, a fluorine level of 900-1200 ppm based on weight of fabric was obtained. The fabrics selected for testing included a blue nylon taffeta, a polyolefin nonwoven and undyed nylon and cotton upholstery fabrics. The polyolefin fabric was dried at room temperature for 24 hours and then heat-treated at 38° C. for 10 seconds. The nylon taffeta fabric was air-dried for 24 hours and the upholstery fabrics were air-dried for 72 hours.

2. Water Repellency Spray Test

The treated fabric samples were tested for alcohol repellency using AATCC Standard Test Method No. 22 of the American Association of Textile Chemists and Colorists. In that test, 250 mL of water were poured in a narrow stream at a 27 degree angle onto a fabric sample stretched on a 6-inch (15.2 cm) diameter plastic hoop. The water was discharged from a funnel suspended six inches (15.2 cm) above the fabric sample. After removal of excess water, the fabric was visually scored by reference to published standards. A rating of 100 denotes no water penetration or surface adhesion; a rating of 90 denotes slight random sticking or wetting; lower values indicate greater wetting and a rating of 0 indicates complete wetting.

3. Water Repellency Test

A series of standard test solutions made from water and isopropyl alcohol (IPA) identified in Table 2 were applied dropwise to the fabric samples. Beginning with the lowest numbered test liquid (Repellency Rating No. 1) one drop (approximately 5mm in diameter or 0.05 mL volume) was placed on each of three locations at least 2 inches apart. The drops were observed for ten seconds. If after ten seconds two of the three drops were still visible as spherical to hemispherical, three drops of the next higher numbered test liquid were placed on adjacent sites and observed for ten seconds. This procedure was continued until one of the test liquids results in two of the three drops failing to remain spherical to hemispherical. The water repellency of the fabric was the highest numbered test liquid for which two of the three drops remained spherical to hemispherical.

TABLE 2

| STANDARD WATER TEST SOLUTIONS | | | | | |
|---|---|---|---|---|---|
| Water Repellency Rating Number | Composition | | Water Repellency Rating Number | Composition | |
| | % IPA | % Water | | % IPA | % Water |
| 1 | 2 | 98 | 7 | 50 | 50 |
| 2 | 5 | 95 | 8 | 60 | 40 |
| 3 | 10 | 90 | 9 | 70 | 30 |
| 4 | 20 | 80 | 10 | 80 | 20 |
| 5 | 30 | 70 | 11 | 90 | 10 |
| 6 | 40 | 60 | 12 | 100 | 0 |

4. Oil Repellency

Treated fabric samples were tested for oil repellency by a modification of AATCC Standard Test Method No. 118, conducted as follows. A series of organic liquids, identified below in Table 3 were applied dropwise to the fabric samples. Beginning with the lowest numbered test liquid, (Repellency Rating No. 1) one drop (approximately 5 mm in diameter or 0.05 mL volume) was placed on each of three locations at least 5 mm apart. The drops were observed for 30 seconds. If, at the end of this period, two of the three drops were still spherical to hemispherical in shape with no wicking around the drops, three drops of the next highest numbered liquid were placed on adjacent sites and similarly observed for 30 seconds. The procedure was continued until one of the test liquids results in two of the three drops failing to remain spherical to hemispherical, or wetting or wicking occurs. The oil-repellency rating of the fabric is the highest numbered test liquid for which two of the three drops remain spherical to hemispherical, with no wicking for 30 seconds.

TABLE 3

OIL REPELLENCY TEST LIQUIDS

| Oil Repellency Rating Number | Test Solution |
|---|---|
| 1 | Nujol* Purified Mineral Oil (*Trademark of Plough, Inc.) |
| 2 | 65/35 Nujol/n-hexadecane by volume |
| 3 | n-hexadecane |
| 4 | n-tetradecan |
| 4 | n-dodecane |
| 6 | n-decane |

Using the foregoing three TEST METHODS to treat fabrics with the fluoropolymer compositions of EXAMPLES 1-10 and CONTROLS A, B, C & D (described below), all in the form of aqueous emulsions, showed that the fluoropolymers of EXAMPLES 1-10 imparted oil- and water-repellency to the fabrics tested without the need to effect curing at elevated temperature by prior art procedures, whereas the CONTROL polymers either failed to do so at all or did so to an extent which would not be suitable commercially. CONTROL A contained no polymer units derived from vinylidene chloride. CONTROL B contained no polymer units derived from a nonfluorinated (meth)acrylate. CONTROL C consists of an aqueous emulsion copolymer of 60% perfiuoroalkylethyl acrylate, 20% stearyl acrylate, 20% vinylidene chloride, 1% each N-methylolacrylamide, 2-hydroxyethyl methacrylate and 2% 2-hydroxyethyl methacrylate/ethylene oxide (6) adduct. The perfiuoroalkylethyl acrylate used to produce the CONTROL C finish was a mixture of monomers characterized by the general formula:

$$CF_3CF_2(CF_2)_kC_2H_4OC(O)CH=CH_2$$

wherein k=4, 6, 8, 10, and ¢12 as described by Greenwood, et al. (vide supra). CONTROL D is a commercial repellent product for textiles derived from a physical blend described in U.S. Pat. No. 4,595,518 which is based on:

1. A Perfiuoroalkylethyl citrate urethane (anionic dispersion);
2. A 75/25/0.25/0.25 perfiuoroalkylethyl methacrylate/2-ethylhexylmethacrylate/N-methylolacrylamide /2-hydroxyethyl methacrylate copolymer;
3. A 65/35/0.25 perfiuoroalkylethyl methacrylate/Lauryl methacrylate/N-methylolacrylamide copolymer and
4. Neoprene Latex, dispersed with Tween 80 surfactant, and the pH adjusted with polydimethylaminoethylmethacrylate/acrylics.

We claim:

1. A copolymer the polymer units of which consist essentially of
   a) 50-80 weight. % of perfiuoroalkylethyl (meth)acrylates,
   b) 10-40 weight. % of a $C_2$-$C_{20}$ alkyl (meth)acrylate,
   c) 10-40 weight. % of vinylidene chloride,
   d) 0-2 weight. % of N-methylol-acrylamide,
   e) 0-2 weight. % of 2-hydroxyethyl methacrylate and
   f) 0-5 weight. % of 2-hydroxyethyl methacrylate/ethylene oxide adduct;

said perfluoroalkyl-ethyl (meth)acrylates being in the form of mixtures of monomers having the formula:

$$CF_3CF_2(CF_2)_kCH_2CH_2OC(O)C(R)=CH_2$$

wherein R=H or $CH_3$, and k is 4,6,8,10 and 12 having a distribution consisting essentially of:
   25-70 weight % of monomers wherein k=4 or less
   20-40 weight % of monomers wherein k=6
   5-25 weight % of monomers wherein k=8
   0-15 weight % of monomers wherein k=10 or greater.

2. The polymer of claim 1 wherein said fluoro(meth)acrylate monomer distribution consists essentially of:
   45-70 weight % of monomers wherein k=4 or less
   20-35 weight % of monomers wherein k=6
   5-10 weight % of monomers wherein k=8
   0-5 weight % of monomers wherein k=10 or greater.

3. The polymer of claim 1 wherein said fluoro(meth)acrylate monomer distribution consists essentially of:
   25-45 weight % of monomers wherein k=4 or less
   25-40 weight % of monomers wherein k=6
   10-25 weight % of monomers wherein k=8
   1-15 weight % of monomers wherein k=10 or greater.

4. The polymer of claim 1 wherein R is $CH_3$.

* * * * *